Figure 1:
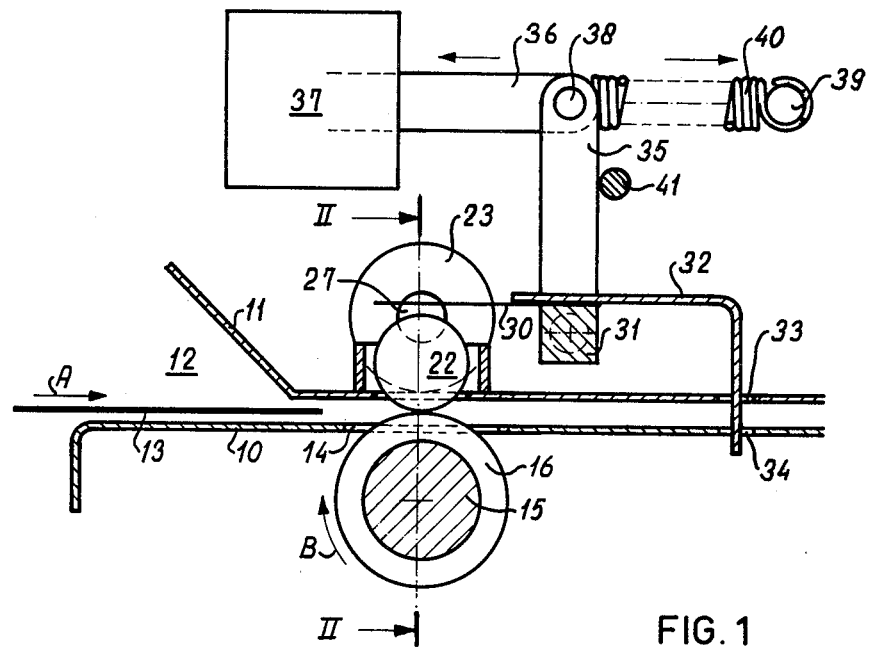

United States Patent [19]

Joosten

[11] 4,203,588
[45] May 20, 1980

[54] DEVICE FOR COPYING SHEETLIKE ORIGINALS

[75] Inventor: Joannes J. W. M. Joosten, Baarlo, Netherlands

[73] Assignee: Oce-van der Grinten N.V., Venlo, Netherlands

[21] Appl. No.: 851,832

[22] Filed: Nov. 16, 1977

[30] Foreign Application Priority Data

Nov. 16, 1976 [NL] Netherlands .................. 7612692

[51] Int. Cl.² ............................................. B65H 9/06
[52] U.S. Cl. .................................. 271/246; 271/236; 271/274
[58] Field of Search ............... 271/246, 245, 265, 272, 271/273, 274, 236, 237, 238, 247

[56] References Cited

U.S. PATENT DOCUMENTS

| 742,641 | 10/1903 | Harris | 271/236 |
| 3,186,325 | 6/1965 | De Belder | 271/246 X |
| 3,637,203 | 1/1972 | French | 271/246 |
| 4,078,790 | 3/1978 | Stocker | 271/246 X |

OTHER PUBLICATIONS

Souba, C. H. "Document Feed Device", *IBM Technical Disclosure Bulletin*, vol. 14, No. 7, Dec. 1971, p. 2181.

*Primary Examiner*—Bruce H. Stoner, Jr.

*Attorney, Agent, or Firm*—Albert C. Johnston; Alphonse R. Noë

[57] ABSTRACT

An apparatus for feeding sheetlike originals to be copied which has a defined path for conveying the original that includes a feed section with guide elements which together form a feed slot and a continuously driven roller for conveying an original introduced in the path further includes a sheet arresting element located downstream of the driven roller and movable between two positions, namely, a first position in which the arresting element blocks the path of conveyance, and a second position in which the arresting element lies outside of the path of conveyance. At the same time, in the first position of the arresting element, the driven roller cooperates exclusively with a plurality of freely rotatable spherical elements, resulting in a force between the driven roller and the spherical elements which is sufficient to convey the original up to and against the arresting element for proper alignment of its leading edge after which the driven roller slips relative to the original, while in the second position of the arresting element the driven roller cooperates with a number of freely rotatable friction rolls to convey the original further. Thus, a new original can be placed in readiness for feeding while the preceding original is still being processed and it is possible to easily adjust or change the position of the original in a lateral direction.

2 Claims, 2 Drawing Figures

U.S. Patent

May 20, 1980

4,203,588

DEVICE FOR COPYING SHEETLIKE ORIGINALS

This invention relates to a copying machine for copying sheetlike originals, and more particularly to an apparatus for feeding the sheetlike originals to be copied which has a defined path for conveying the original that includes a feed section with guide elements which together form a feed slot and continuously driven roller means for conveying an original introduced in the path. In known apparatus of this type, an original to be copied is introduced after the preceding original which has been copied has left the apparatus. This results in loss of time when successively copying several originals.

An object of this invention is the provision of a feeding apparatus of the type described above with which successive sheetlike originals can be reproduced quickly and efficiently.

This object is achieved, according to this invention, with a sheet feeding apparatus having a sheet arresting element located downstream of the driven roller, that is, behind the driven roller when viewed in the direction of conveyance of the original, and movable between two positions, namely, a first position in which the arresting element blocks the path of conveyance, and a second position in which the arresting element lies outside of the path of conveyance. At the same time, in the first position of the arresting element, the driven roller cooperates exclusively with a plurality of freely rotatable spherical elements, resulting in a force between the driven roller and the spherical elements which is sufficient to convey the original up to and against the arresting element after which the driven roller slips relative to the original, while in the second position of the arresting element the driven roller cooperates with a number of freely rotatable friction rolls to convey the original further.

In this manner, a new original can be placed in readiness for feeding while the preceding original is still being processed. Also, the leading edge of the original sheet introduced in the path will always be properly aligned by the action of the sheet arresting element. Moreover, it is possible to adjust or change the position of the original in a lateral direction, that is, in the direction perpendicular to the direction of conveyance, due to the universal rolling movement of the spherical elements that enables displacement in all directions. After such adjustment, the alignment of the leading edge of the original will again automatically be corrected if, as a result of this adjustment or displacement, the edge loses its proper position.

In "IBM Technical Disclosure Bulletin", Vol. 14, No. 7, December 1971, p. 2181, there is disclosed a document feed device having a continuously driven roller and a number of magnetically actuated spherical elements which can cooperate with the roller for feeding a sheet from a rest position to a work station. However, no provision is made for aligning the leading edge of a sheet. Nor is such a device suitable for the purpose of the present invention, since in the waiting position the sheet is not positively arrested, a factor which may be of importance with long originals the greater part of which hang out of the apparatus tending to cause the original sheet to fall back out of the feed slot.

Figure 2:
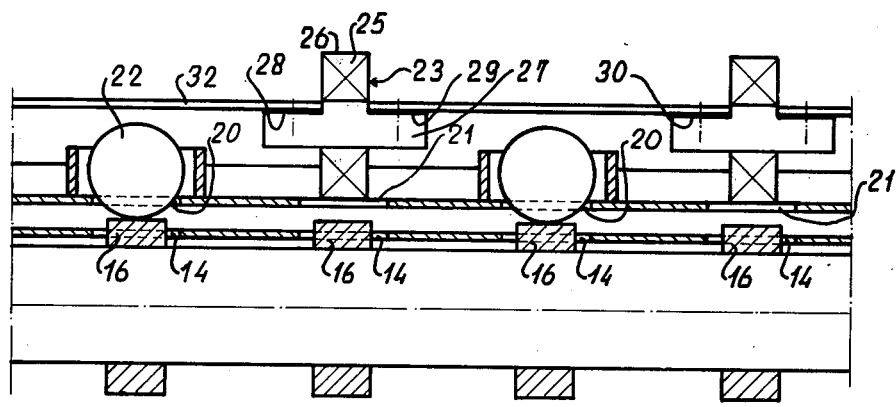

The foregoing and other objects, features and advantages of this invention will become more apparent from the following description of a preferred embodiment thereof taken in conjunction with the accompanying drawings, in which:

FIG. 1 is a schematic view, in section, of the feed portion of a copying machine provided with an apparatus according to an embodiment of the invention, and FIG. 2 is a view, in section, taken along the line II—II of FIG. 1.

Referring to FIG. 1, there is schematically shown, the feed section of a copying machine which may be of the type described in more detail in copending patent application Serial No. 437,152, filed Jan. 28, 1974, now U.S. Pat. No. 4,058,359, and assigned to the assignee of the present invention. The feed section comprises a lower guide 10 and an upper guide 11, of which the left ends are seen in FIG. 1, which together form a feed slot 12 for a sheetlike original 13 which can be introduced therein manually in the direction of the arrow A. A plurality of rectangular openings 14 are formed in the lower guide 10 and are arranged to lie on one line in a direction perpendicular to the direction of movement of the original. A shaft 15 is mounted below the openings 14 and is supported in bearings freely rotatably in sideplates (not shown) of the apparatus and is continuously driven by known means (not shown) in the direction of the arrow B. A ring 16 is firmly secured to the shaft 15 at a location corresponding to each opening 14. The rings 16 have an outer diameter such that a circumferential portion extends through the openings 14 into the channel formed between the guide plates 10 and 11.

The upper guide 11 contains a first set of openings 20 and a second set of openings 21, each of which lies opposite an opening 14. In the embodiment illustrated in FIG. 2, openings 20 and 21 are alternately situated opposite respective openings 14 when viewed in the direction of the axis of the shaft 15. The openings 20 are circular while the openings 21 are rectangular. Each circular opening 20 cooperates with a ball 22, for example, a marble, having an outer diameter which is slightly larger than the diameter of the opening 20. The circumference of each ball 22 rests on the circumferential portion of the ring 16 and, in the embodiment shown, is kept in the opening 20 as a result of gravitational force.

A friction roll 23 corresponds with each opening 21 and can be displaced, with the aid of a mechanism described in greater detail below, between two positions, a first position (shown in FIGS. 1 and 2) in which each roll 23 is situated entirely above the guide 11, and a second position in which each roll 23 extends through the opening 21 corresponding to it, and presses, with its circumferential surface, against the circumferential surface of the opposite ring 16.

In the embodiment shown, each roll 23 is formed by a cylindrical bearing 25 the outer circumference of which has an anti-slip coating 26, such as a rubber ring. The bearing 25 is fixed on a shaft 27, having two flattened portions 28 and 29 through which the shaft is joined to a flexible plate 30 by known means such as screws. The plate 30 contains, along one longitudinal edge, a number of rectangular notches for receiving the rolls 23, so that each rectangular notch corresponds with and lies opposite an opening 21 (FIG. 2).

The other longitudinal edge of the plate 30 is fixed on a lever rod 31, which is freely rotatably mounted between frameplates (not shown) of the apparatus. The rod 31 also has fixed to it a leg of an L-shaped element 32. The other leg of this L-shaped element extends through openings 33, 34, respectively, in the guide plates 11 and 10, respectively, when in the first position of the rolls 23 shown in FIG. 1. In the second position of the rolls 23, the L-shaped element 32 lies entirely outside of the space between the guide plates 10 and 11.

In order to move the rolls 23 from the first to the second position, and back, the rod 31 is firmly connected to one end of an arm 35, the other end of the arm 35 is connected to a lifting arm 36 by means of a hinge pin 38. The lifting arm moves in a horizontal direction through the action of an electromagnetic lifting magnet 37. When the electromagnet 37 is deactivated the arm 35, and consequently the rolls 23, will be maintained in the position shown in FIG. 1 as a result of the force of a spring 40, and a stop-bar 41, connected to the hinge pin 38 and to a fixed pin 39. When the electromagnet 37 is energized, the pulling force of the spring 40 is overcome and the rolls 23 move to the second position, since the stroke length of the electromagnet 37 and the intermediate transmission mechanism associated therewith are chosen to move the rolls 23, shown in FIG. 1, further than the least distance which exists, in the first position shown, between the outer circumferences of the rolls 23 and the rings 16. This causes the flexible plate 30 to deflect so that the rolls 23 press firmly against the rings 16. The friction rolls 23 and the L-shaped arresting element 32 thus move in an interdependent relationship.

The feed apparatus operates as follows. When an original sheet 13 to be copied is introduced into the feed slot 12, the apparatus is in the position shown in FIG. 1. As soon as the leading edge of an original 13 arrives between the rings 16 and the balls 22, the original will be further conveyed without external help as far as the arrest formed by a leg of the L-shaped element 32. It is possible for the original to move in such a way with regard to the balls 22 and the rings 16, that the full width of its leading edge lies against the arrest and is properly aligned. In this condition of operation, the rings 16 will start slipping over the original, which is pressed against the rings with only slight force. However, the force of the balls 22 is sufficient to keep the original in its place, even when a significant portion of the original, such as shown at the left in FIG. 1, would be hanging down from the lower guide plate 10.

Also in this condition of operation, it is possible to displace the original in a direction at a right angle to the feed and conveyance direction and in parallel to the shaft 15 to correct the location of the original in this direction. This may be of importance in connection with the positioning of the original with regard to receiving material or to an optical system. Any displacement of the original in this or another direction again and again results in automatic correction of the alignment of its leading edge by the arrest.

It is also possible to place a new original in a ready position, while the preceding original is still being processed in the machine. As soon as the original lying in the ready position can be introduced, such as when the preceding original has left the machine, or because a manual command is given to further introduce the ready original, the lifting magnet 37 is energized causing the rolls 23 to press firmly against the rings 16, and at the same time raising the arrest formed by a leg of the L-shaped element 32. The rings 16 can then no longer slip relative to the original and the passage is cleared so that the original will now be conveyed further.

After the trailing edge of the original has passed the openings 33, 34, the energization of the electromagnet 37 is discontinued in response to a signal from an appropriate known sensing means and the system returns to the position shown in FIG. 1. Moreover, an external indication can be provided, for example, a small lamp can be lit, to indicate that the next original can be placed in the ready position in the manner described above.

Those skilled in the art will realize that the invention is not limited to the embodiment described but that within the boundaries of the invention numerous modifications are possible. Thus, it is possible to press the balls 22 against the rings 16 using small springs, which may be of importance when the feed section is not installed horizontally, or when the system must be rotated 180° in connection with specific requirements. Also, the arrest can be provided in the form of a number of L-shaped pins which are fixed evenly spaced on the rod 31.

I claim:

1. In an apparatus for feeding sheetlike originals to be copied, including a defined path for the original having a feed section with guide elements which together form a feed slot and a continuously driven roller means for conveying an original introduced in the path, the improvement comprising an arresting element located behind the driven roller means when viewed in the direction of movement of the original and movable between two positions, namely a first position in which the arresting element blocks the path and a second position in which the arresting element lies outside of the path, a plurality of freely rotatable spherical elements with which the driven roller means cooperates in the first position such that a force exists between the driven roller means and the spherical elements which is sufficient to convey an original up to and against the arresting element, after which the driven roller means slips relative to the original, a plurality of freely rotatable friction rolls cooperating with the driven roller means in the second position of the arresting element to convey the original further, a lever rod rotatable to at least a first and a second position, the arresting element being connected to the lever rod, the friction rolls being disposed on a flexible element connected to the lever rod, the arresting element and the friction rolls being movable in interdependent relationship to one another when the lever rod rotates, the first and second positions of rotation of the lever rod being such that rotation from one position to the other moves the friction rolls a distance which is greater than the distance which exists, in the first position of the arresting element, between the surfaces of the driven roller means and the friction rolls, thereby causing the flexible element to urge the friction rollers against the driven roller means in the second position of rotation of the lever rod.

2. The improved apparatus as claimed in claim 1 wherein the spherical elements contact the driven roller means solely as a result of gravitational force.

* * * * *